Feb. 12, 1952 W. I. EVANS ET AL 2,585,304
ROD TO PLATE JOINT STRUCTURE
Filed June 16, 1947 2 SHEETS—SHEET 1
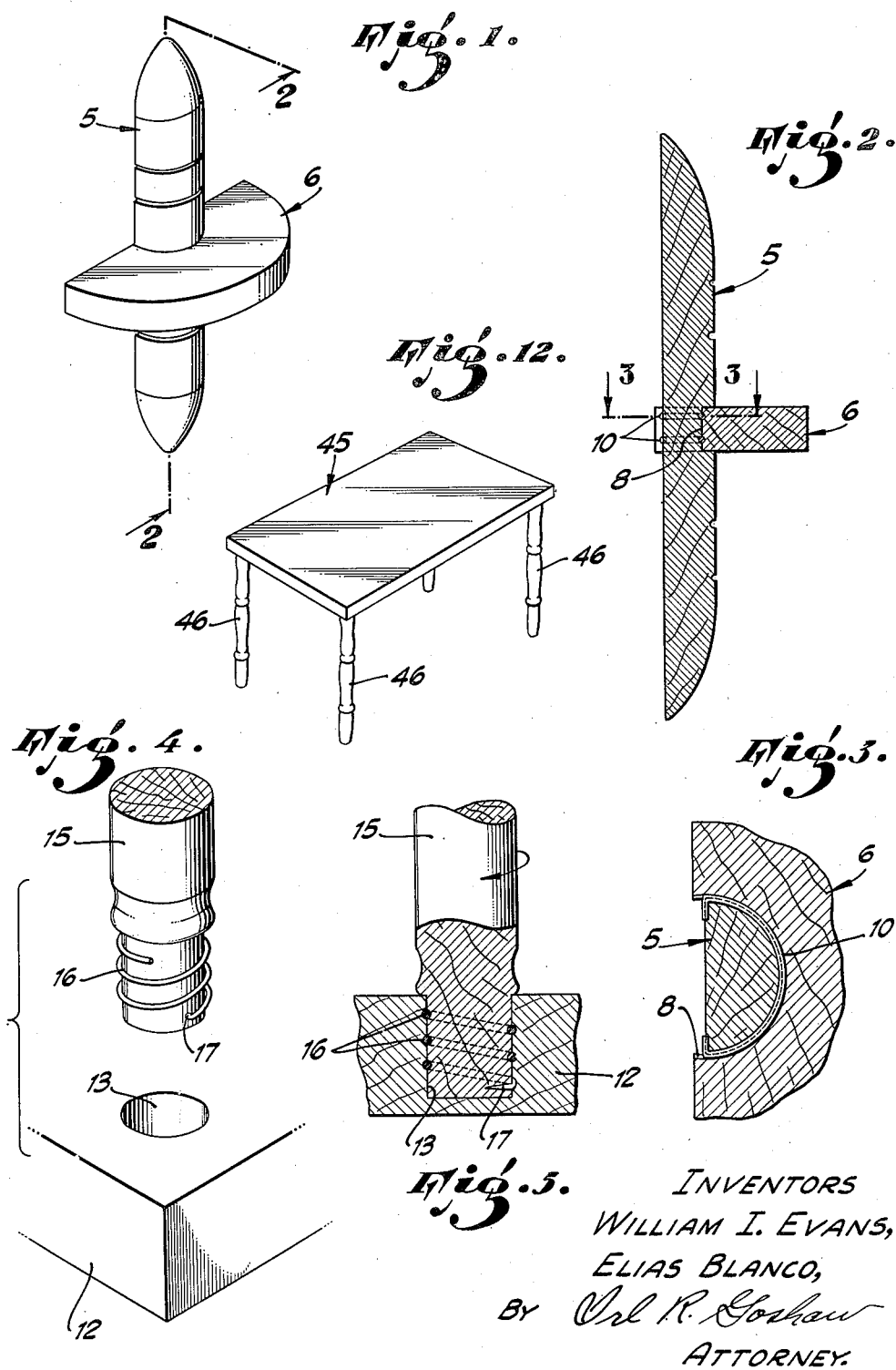
INVENTORS
WILLIAM I. EVANS,
ELIAS BLANCO,
BY Orl R. Goshaw
ATTORNEY.

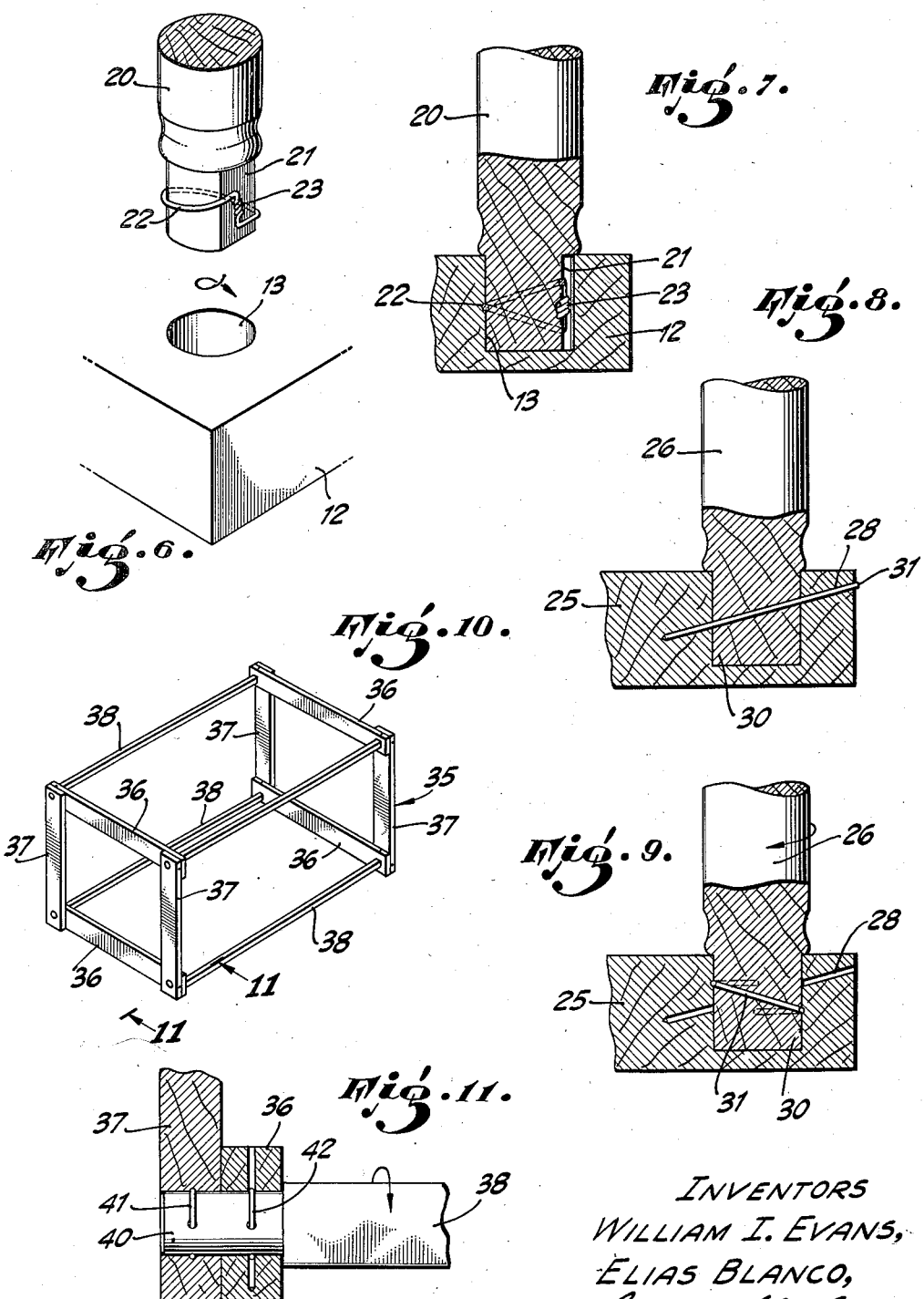

Patented Feb. 12, 1952

2,585,304

UNITED STATES PATENT OFFICE 2,585,304

ROD TO PLATE JOINT STRUCTURE

William I. Evans and Elias Blanco,
Los Angeles, Calif.

Application June 16, 1947, Serial No. 754,898

4 Claims. (Cl. 287—20)

This invention relates to a method of and means for joining two elements, particularly elements of wood, plastics and the like, used in the construction of articles such as furniture, boxes, crates, etc.

In our U. S. Patent No. 2,464,743 of Mar. 15, 1949, we disclose and claim a joint requiring no nails, screws, glue or any other of the normal means of attaching a shelf element to a spindle or leg in the construction of wall brackets and similar articles. The present invention describes a modification of this type of joint and in addition a method of and means for joining a cylindrical spindle or post in a cylindrical hole in a shelf or table top without nails, screws or glue. However, if a permanent joint is to be made, glue may be inserted in the hole, the new joint construction holding the elements firmly in position until the glue sets. The present invention also embodies a joint which may be employed in the construction of collapsible boxes, thus permitting the box or crate to be used over again.

The primary advantage of the present construction is that the elements to be joined together may be completely prefabricated except for the assembling thereof, the latter step being done by anyone regardless of his or her skill as a carpenter. Because of this feature, therefore, many items of furniture may be shipped or transported in a knocked-down condition, thus occupying a minimum of shipping and/or storage space. The articles may then be quickly and easily assembled in the home or other point of use by anyone purchasing the article, the joints being such that the assembled article will be as permanent as though put together by a skilled cabinet maker.

The principal object of the invention, therefore, is to facilitate the constructing and assembling of fabricated articles.

Another object of the invention is to provide an improved method of constructing and assembling articles of furniture, boxes, crates, etc.

A further object of the invention is to provide an improved fabricated article construction.

A still further object of the invention is to provide a new type of jointure between elements such as that between spindles or legs and holes in shelves or table tops.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a perspective view of an article assembled in accordance with our improvement in the joint shown in our above identified patent;

Fig. 2 is a vertical cross-sectional view of the article shown in Fig. 1, taken along the lines 2—2 of Fig. 1;

Fig. 3 is a transverse cross-sectional view taken along the line 3—3 of Fig. 2;

Fig. 4 is a partial perspective view of a jointure construction between a cylindrical spindle and flat element;

Fig. 5 is a cross-sectional view of the joint shown in Fig. 4;

Fig. 6 is a perspective view of another modification of the joint shown in Fig. 4;

Fig. 7 is a cross-sectional view of the joint shown in Fig. 6;

Figs. 8 and 9 are cross-sectional views of a modification of the joints shown in Figs. 4 to 7, inclusive, Fig. 8 showing one step in the joining operation and Fig. 9 showing the completion of the joint;

Fig. 10 is a perspective view of a box or crate embodying a joint permitting collapsing of the box or crate;

Fig. 11 is a cross-sectional view taken along the lines 11—11 of Fig. 10; and

Fig. 12 is a perspective view of a table utilizing any of the joints shown in Figs. 4 to 11, inclusive.

Referring now to Figs. 1, 2 and 3, the spindle 5, which may be a split cylindrical spindle or leg, commonly known as a half round, is shown attached to a flat element or shelf 6 in the manner disclosed and claimed in our above mentioned patent. The relationship existing between the spindle section 5 and shelf 6 is the same as disclosed in this prior patent, that is, the inside diameter of the hole 8 in the shelf 6 and the outside diameter of the post 5 are substantially the same so that the two elements may be firmly joined and remain so unless twisted with respect to one another. To increase the tightness, or permanency, of the joint, while at the same time permitting increased manufacturing tolerances in the diameters of the spindle and the hole 8, two semicircular wires 10, having bent over ends as shown in Fig. 3, are attached to the spindle 5 where it joins the shelf 6. When the spindle is inserted in the hole 8 the wires will be partially embedded in the spindle and shelf elements providing an interlock between them which provides an extremely tight and permanent joint, but one which does permit the disassembly of the units if desired. However, the joint may be easily glued by applying glue between the wires on the spindle before insertion in the hole. This provides an unusually solid and firm joint and permits a glue joint to be made without the use of clamps.

In the remaining figures, a joint between a cylindrical spindle and a flat element having a hole therein is shown of the same general nature as the joint used with the half round spindle. Although the joint shown in Figs. 1 to 3, inclusive, is particularly suitable for wall shelves and the like, for tables, chairs, boxes, etc. the joints shown in the remaining figures are preferred.

Referring now to Figs. 4 and 5, the corner of a flat element 12 which may be a table top such as 45 in Fig. 12, is shown having a hole 13 therein which may be drilled only partially through the element 12 as shown in Fig. 5. For insertion in the hole 13 of the flat element 12 is a portion of a spindle or leg 15, which may be one of the legs 46 in Fig. 12, on the cylindrical end of which is wound a spiral wire 16 having the end 17 thereof embedded in the surface of the spindle. Although the wire 16 may be placed on the spindle at any time, it is preferably done at the factory so that the user may simply insert the end of the spindle 15 in the hole 13 and twist the spindle in a clock-wise direction. The wire 16 forms a thread which advances the spindle into the hole and, as the wire will be partially embedded in both the end of the spindle and the element 12 because of the pressure between them, the final joint becomes a very tight and permanent one. In this modification the element 12 may also be the bottom of a box or the seat of a chair while the body of the spindle 15 may be square, rectangular, curved or any suitable shape in accordance with the design of the article. This construction also eliminates the use of clamps if it is desired to glue the joint since the wire thread maintains the joined elements firmly in position during the setting period.

A similar type of joint is shown in Figs. 6 and 7. The same element 12 being shown with its hole 13. In this case a spindle 20 has a flat side 21 on the portion thereof to be inserted into the hole 13 and has a single turn of a wire therearound which may be twisted together on the flat surface at 21 as shown at 23. The single turn is given a definite pitch which permits it to act as a thread when the end of the spindle 20 is inserted into the hole and the spindle twisted.

In Figs. 8 and 9 a more permanent type of joint is disclosed wherein a flat element 25 has a spindle or leg 26 joined thereto. To provide this type of joint, a hole 28 is drilled through the member 25 and the end 30 of the spindle at an angle to the cylindrical surface of the end of the spindle 26 with the end 30 in position in the member 25. The spindle and element may then be separated for shipment or storage. To later assemble the members a wire 31 is inserted in the hole 28 and the spindle is then twisted or rotated in the member 25. As shown in Fig. 9, the twisting action withdraws the ends of the wire from the portions of the hole 28 in the element 25 and wraps them around the end 30. The wire ends are thus embedded in both the end 30 and the member 25, thereby forming a very tight and permanent joint. This joint may also be glued without the use of clamps.

A similar type of joint is shown in Figs. 10 and 11, but one which is particularly adaptable to the construction of collapsible articles such as the box or crate frame shown generally at 35 in Fig. 10. This crate consists of elements such as end cross members 36, vertical members 37 at both ends of the box, and longitudinal members 38 interconnecting the ends. The crate may be used in the manner shown or sides may be attached to the longitudinal members 38.

The members 36, 37 and 38 are joined together as shown in Fig. 11, that is, the cylindrical ends 40 of the longitudinal members 38 have small holes similar to holes 28 in Figs. 8 and 9 therethrough in alignment with holes in members 36 and 37, as explained above except that the axes of the holes are now perpendicular to the cylindrical surface of the ends 40. Wires such as shown at 41 and 42 are then inserted in the small holes and the members 38 are twisted with respect to members 36 and 37 which embeds the ends of the wires in the surface of the end 40 and in the internal surfaces of the holes in members 36 and 37 accommodating the ends 40. This construction produces a joint which does not permit longitudinal separation of the members 36 and 37 from the ends 40, but does permit rotational movement thereof around the ends 40. Thus, the crate or box form 35 may be collapsed and expanded at will, even when solid sides are attached to the longitudinal members 38.

Fig. 12 shows a simple table construction which may utilize any of the joints shown in Figs. 4 to 11, inclusive, although it is to be understood that the joint structure may be used for many other articles of furniture.

We claim:

1. A fabricated article comprising an element having a recess along the edge thereof, said recess having an arcuate boundary of an extent of more than 180°, a post element engaged in said recess and having a diameter substantially equal to twice the radius of said arcuate boundary, said post element having a substantially flat side, and at least one wire element around the curved surface of said post element partially embedded in the portion of said post element contacted by said wire and partially embedded in the arcuate boundary surface of said recess contacted by said wire, the ends of said wire element being bent over a portion of the flat surface of said post element.

2. A fabricated article comprising a first element having a recess therein, said recess having an arcuate boundary of an extent of more than 180°, a second element having a curved portion contacting the surface of said recess, said second element having a diameter substantially equal to twice the radius of said arcuate boundary, and a wire around said curved portion of said second element, relative rotation between said elements embedding the portion of said wire in contact with the arcuate boundary surface of said recess and the surface of said curved portion of said second element partially in each of said contacted surfaces.

3. A fabricated article comprising a first element having a recess therein, said recess having an arcuate boundary of an extent of more than 180°, a second element having a curved portion in contact with the surface of said recess, said second element having a diameter substantially equal to twice the radius of said arcuate boundary, and a wire around said curved portion of said second element, the portion of said wire between the contacting surfaces of said elements being embedded partially in each of said surfaces.

4. The method of joining two elements comprising forming a recess in one of said elements, said recess having an arcuate boundary of an extent of more than 180°, forming a second element with a curved portion of a diameter substantially equal to twice the radius of said arcuate boundary and with a substantially flat portion, attaching a wire around the surface of said curved portion of said second element, moving a part of said curved portion of said second element into said recess until the axis of said recess and the axis of said curved portion coincide, and rotating said second mentioned element in said recess, the rotation thereof embedding said wire on said second element partially into each of the contacting surfaces of said elements contacted by said wire.

WILLIAM I. EVANS.
ELIAS BLANCO.

REFERENCES CITED

The following references are of record in the file of this patent:

UNITED STATES PATENTS

| Number | Name | Date |
|---|---|---|
| 534,164 | Larsh | Feb. 12, 1895 |
| 1,645,490 | Keener | Oct. 11, 1927 |
| 2,052,134 | Fitzgibbon et al. | Aug. 25, 1936 |
| 2,464,743 | Evans et al. | Mar. 15, 1949 |

FOREIGN PATENTS

| Number | Country | Date |
|---|---|---|
| 24,122 | Great Britain | Oct. 24, 1913 |
| 250,702 | Great Britain | Apr. 22, 1926 |
| 718,162 | France | Jan. 20, 1932 |